United States Patent [19]

Kitzing et al.

[11] 4,285,859
[45] Aug. 25, 1981

[54] AZO COMPOUNDS USEFUL IN A PHOTOGRAPHIC DYE DIFFUSION TRANSFER PROCESS

[75] Inventors: Rainer Kitzing, Ingatestone; Brian R. D. Whitear, Brentwood; William E. Long, Brentwood; David L. R. Reeves, Brentwood; Glenn P. Wood, Brentwood, all of England

[73] Assignee: Ciba-Geigy AG, Switzerland

[21] Appl. No.: 14,778

[22] Filed: Feb. 23, 1979

[30] Foreign Application Priority Data

Feb. 28, 1978 [GB] United Kingdom ............... 7788/78

[51] Int. Cl.³ .............. C09B 29/06; C09B 29/08; C09B 29/24; C09B 29/36
[52] U.S. Cl. .......................... 260/152; 96/3; 96/22; 96/29 R; 96/90 R; 260/154; 260/155; 260/156; 260/157; 260/159
[58] Field of Search ............. 260/152, 154, 155, 159, 260/156

[56] References Cited

U.S. PATENT DOCUMENTS

| | | |
|---|---|---|
| 2,373,926 | 4/1945 | Trepagnier ..................... 260/155 |
| 2,647,901 | 8/1953 | Archer ......................... 260/159 X |
| 2,694,713 | 11/1954 | Brody ......................... 260/152 X |
| 3,022,316 | 2/1962 | Bestian et al. ................. 260/152 X |
| 3,478,010 | 11/1969 | Hoffmann et al. ............... 260/152 |
| 3,551,406 | 12/1970 | Idelson ........................ 260/154 X |
| 3,772,335 | 11/1973 | Meininger et al. .............. 260/152 X |
| 4,001,204 | 1/1977 | Krutak et al. .................. 260/152 |
| 4,016,151 | 4/1977 | Lotsch ......................... 260/154 |
| 4,072,672 | 2/1978 | Henzi .......................... 260/152 X |

FOREIGN PATENT DOCUMENTS

| | | | |
|---|---|---|---|
| 2557555 | 6/1977 | Fed. Rep. of Germany ........ 260/155 |
| 1347302 | 11/1963 | France ......................... 260/152 |
| 283777 | 1/1928 | United Kingdom ................ 260/152 |
| 651065 | 3/1951 | United Kingdom ................ 260/152 |
| 942844 | 11/1963 | United Kingdom ................ 260/152 |

*Primary Examiner*—John Doll
*Attorney, Agent, or Firm*—Sprung, Felfe, Horn Lynch & Kramer

[57] ABSTRACT

Novel azo compounds and their preparation are provided. These compounds have the general formula

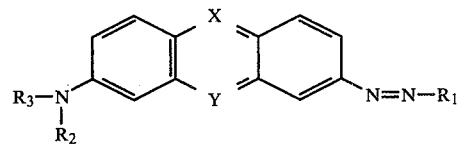

wherein X is N or $CR_4$ where $R_4$ is a hydrogen atom or an optionally substituted alkyl or aryl group, Y is $S^\oplus$, $N^\oplus R_5$, $O^\oplus$ or N where $R_5$ is an optionally substituted alkyl or aryl group, $R_1$ is an optionally substituted alkyl or aryl group, $R_1$ is a substituted aromatic or heterocyclic group containing a ballasting group, $R_2$ and $R_3$ are each hydrogen or alkyl groups having 1 to 4 carbon atoms, or $R_2$ and $R_3$ together with the nitrogen atom complete a heterocyclic ring, or one of $R_2$ or $R_3$ can be hydrogen and the other of $R_2$ or $R_3$ can be aryl. There may be further substitution in either of the benz rings and these rings may be benzannelated. These azo compounds are useful in the photographic field especially in the photographic dye diffusion transfer process for the production of photographic images.

15 Claims, No Drawings

AZO COMPOUNDS USEFUL IN A PHOTOGRAPHIC DYE DIFFUSION TRANSFER PROCESS

This invention relates to novel azo compounds and their preparation.

According to the present invention there are provided azo compounds of the general formula

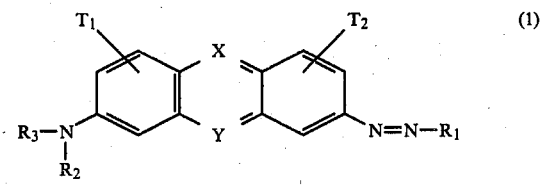

where X is N or $CR_4$ where $R_4$ is a hydrogen atom or an optionally substituted alkyl or aryl group, Y is $S^\oplus$, $N^\oplus R_5$, $O^\oplus$ or N where $R_5$ is a substituted aromatic or heterocyclic group containing a ballasting group, $R_2$ and $R_3$ are each hydrogen atoms or alkyl groups having 1 to 4 carbon atoms, or $R_2$ and $R_3$ together with the nitrogen atom complete a heterocyclic ring, or one of $R_2$ or $R_3$ can be hydrogen and the other of $R_2$ or $R_3$ can be aryl, and $T_1$ and $T_2$ represent hydrogen, substituents or form a benzannelated ring.

Examples of such substituents are alkyl of 1 to 4 carbon atoms and particularly methyl, amino groups and halogen atoms (fluorine, chlorine, bromine).

Preferably the group $R_1$ comprises a heterocyclic or preferably an aromatic ring containing a hydroxy or dialkylamino group with each alkyl of 1 to 18 carbon atoms ortho or para to the azo link as well as a ballasting group.

Preferably $R_4$ is hydrogen, alkyl of 1 to 4 carbon atoms, phenyl or phenyl substituted by alkyl of 1 to 4 carbon atoms, halogen, hydroxy or carboxyl.

Preferably $R_5$ has the meaning of $R_4$ except hydrogen. $R_2$ and $R_3$ are each hydrogen or alkyl of 1 to 4 carbon atoms, or $R_2$ and $R_3$ together with the nitrogen atom complete a 5- or 6-membered heterocyclic ring, or one of $R_2$ or $R_3$ can be hydrogen and the other can be phenyl, and $T_1$ and $T_2$ represent hydrogen, alkyl of 1 to 4 carbon atoms, especially methyl, or they constitute an annelated benzene ring.

Preferred azo compounds of formula (1) are azo compounds of the general formula

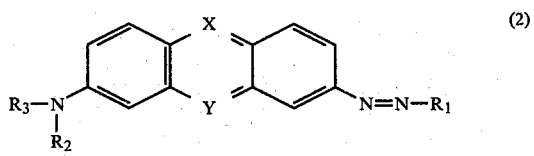

where X is N or $CR_4$ where $R_4$ is a hydrogen atom or an optionally substituted alkyl or aryl group, Y is $S^\oplus$, $N^\oplus R_5$, $O^\oplus$ or N where $R_5$ is an optionally substituted alkyl or aryl group, $R_1$ is a substituted aromatic or heterocyclic group containing a ballasting group, $R_2$ and $R_3$ are each hydrogen atoms or alkyl groups having 1 to 4 carbon atoms.

It is to be understood that there may be further substitution in either of the benz rings in the compound of formula (2) and in particular these rings may be benzannelated or have an alkyl substituent in particular methyl.

A particularly useful group $R_1$ in formulae (1) or (2) is the group of the formula

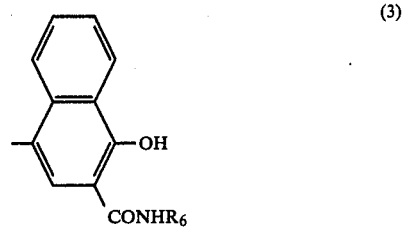

where $R_6$ is either an alkyl group containing at least 10 carbon atoms or a group containing such an alkyl group or is an aryl ballasting group.

An example of an aryl ballasting group is the group of formula

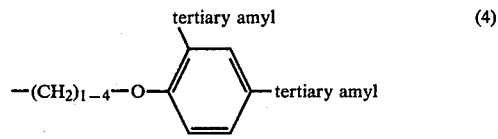

Another useful group $R_1$ is the group of the formula

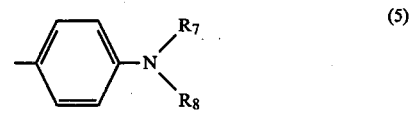

wherein $R_7$ and $R_8$ are both alkyl groups having together at least 12 carbon atoms.

Compounds of formula (1) may be prepared by diazotising a compound of formula

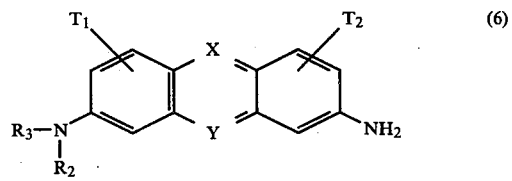

to yield the diazo compound of formula

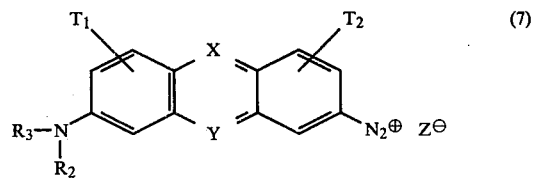

and then coupling the diazo compound of formula (7) with a coupler of the formula $R_1^\ominus A^\oplus$ in alkaline conditions where X, Y, $R_1$, $R_2$, $R_3$, $T_1$ and $T_2$ have the meanings assigned to them above, $Z^\ominus$ is an anion and $A^\oplus$ is a cation.

The general formula (6) covers several well known classes of dyes; compounds of formula (1) wherein X is N and Y is $N^\oplus R_5$ are azo-phenazine compounds.

Particularly useful azo-phenazine compounds of formula (1) are azo-phenazines of formula

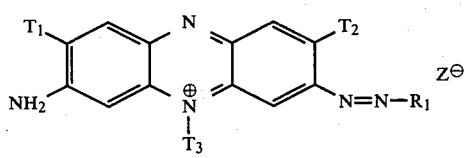
(8)

where $R_1$ has the meaning assigned to it above and $T_1$ and $T_2$ are hydrogen atoms or substituents and in particular methyl groups and $T_3$ is a phenyl or alkyl group, e.g. of 1 to 4 carbon atoms, and $Z^\oplus$ is an anion. Sometimes the dyes exist in the zwitterionic form, especially if $R_1$ is the group of formula (3). Preferably $T_3$ is a phenyl group. Preferably Z is a fluoroborate ion. When the azo link is cleaved a diffusible magenta phenazine dye is released.

An example of such an azo-phenazine compound is the compound of formula

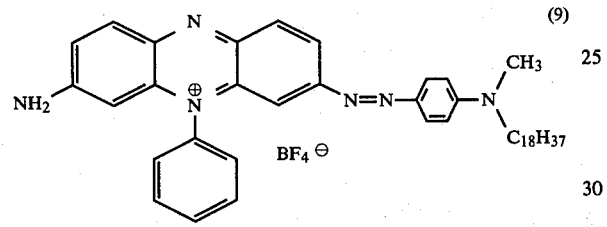
(9)

Another example of such an azo-phenazine compound is the compound of formula

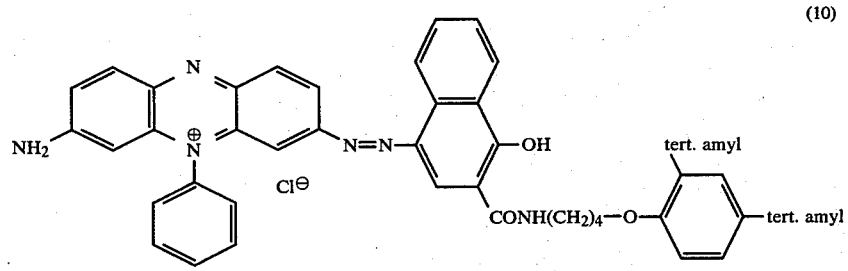
(10)

Compounds of formula (1) wherein X is N and Y is $O^\oplus$ are azo-oxazine compounds.

Particularly useful azo-oxazine compounds of formula (1) are azo-oxazine compounds of formula

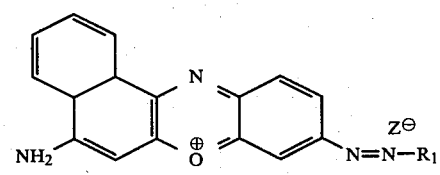
(11)

where $R_1$ and Z have the meanings assigned to them above.

When the azo linkage is cleaved a diffusible blue or bluish oxazine dye is released.

An example of such an azo-oxazine compound is the compound of formula

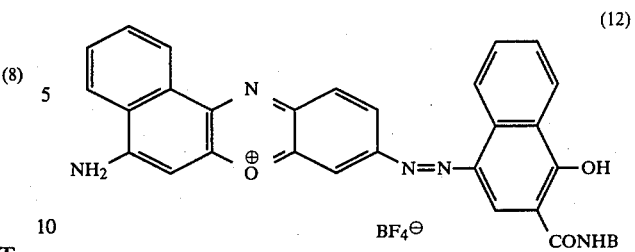
(12)

where B is the group:

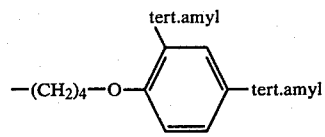

Compounds of formula (1) wherein X is N and Y is $S^\oplus$ are azo-thiazine compounds of formula

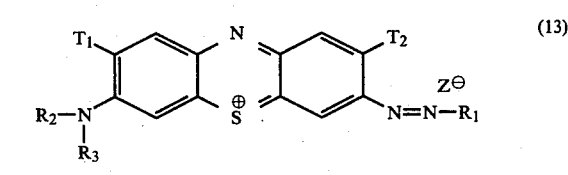
(13)

where $T_1$, $T_2$, $Z^\ominus$, $R_1$, $R_2$ and $R_3$ have the meanings assigned to them above.

When the azo-linkage is cleaved a diffusible blue to magenta thiazine dye is released.

Preferably $R_2$, $R_3$ and $T_2$ are each methyl groups.

An example of such an azo-thiazine compound is the compound of formula

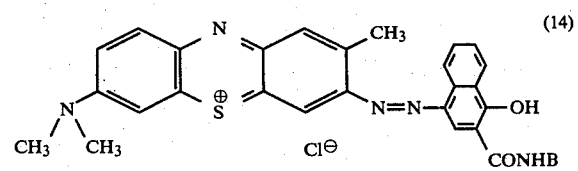
(14)

where B has the meaning assigned to it above.

Compounds of formula (1) wherein X is $CR_4$ and Y is $N^\oplus R_5$ are azo-acridine compounds of formula

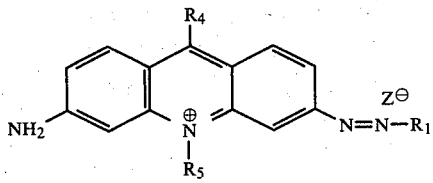

where $R_1$, $R_4$, $R_5$ and $Z$ have the meanings assigned to them above.

When the azo linkage is cleaved a yellow diffusible acridine dye is released.

Preferably $R_4$ is hydrogen and $R_5$ is methyl.

An example of such an azo-acridine compound is the compound of formula

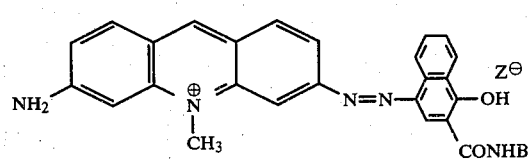

where B and Z have the meanings assigned to them above.

Other useful azo-acridine compounds of formula (1), when X is $CR_4$ and Y is N, are azo-acridine compounds of formula

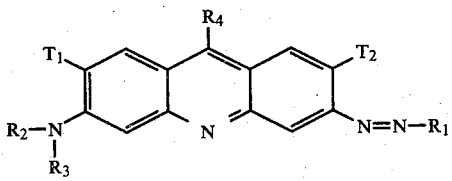

where $R_1$, $T_1$, $T_2$, $R_2$, $R_3$ and $R_4$ have the meanings assigned to them above.

When the azo linkage is cleaved a diffusible yellow acridine dye is released.

Preferably $T_1$ and $T_2$ are each methyl and $R_2$, $R_3$ and $R_4$ are hydrogen.

An example of such an azo-acridine compound is the compound of formula

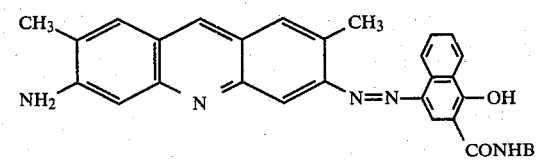

where B has the meaning assigned to it above.

Compounds of formula (1) wherein X is $CR_4$ and Y is $O^\oplus$ are azo-pyrylium compounds (or azo-oxanthracene compounds).

Particularly suitable azo-pyrylium compounds of formula (1) are azo-pyrylium compounds of formula

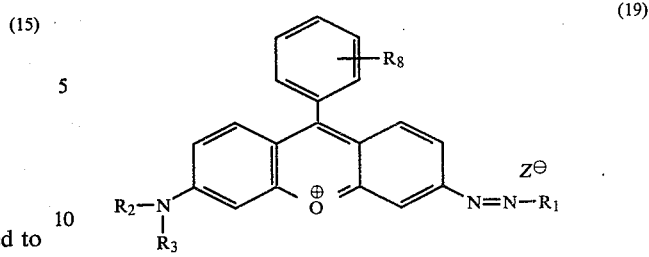

where $R_1$, $R_2$, $Z^\ominus$ and $R_3$ have the meanings assigned to them above and $R_8$ is a substituent or hydrogen. Examples of substituents which $R_8$ can represent are —COOH, alkyl, e.g. of 1 to 4 carbon atoms, and halogen, e.g. chlorine or bromine.

Preferably $R_8$ is —COOH and such compounds are in fact derivatives of rhodamine.

Preferably $R_2$ and $R_3$ are hydrogen.

When the azo linkage is cleaved a yellow-magenta diffusible azo-pyrylium dye is released.

An example of such an azo-pyrylium dye which is an azo-rhodamine is the compound of formula

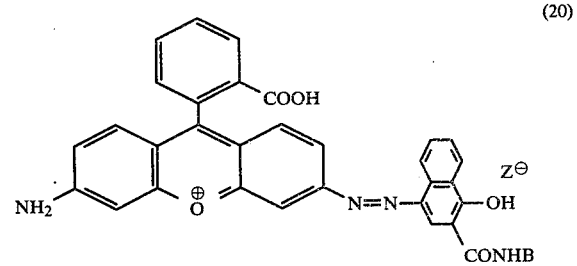

where B is $Z^\ominus$ have the meanings assigned to them above.

The azo compounds of formulae (1) and (2) are of use in a photographic process wherein photographic material which comprises a certain class of azo compounds which includes the azo compounds of formulae (1) and (2) is treated with a reducing agent which breaks the azo link and a dye is liberated which is mordanted in a receiving layer, so forming a dye image. Thus the compounds of formula (1) and (2) comprise a diffusible dye moiety linked by an azo linkage to a group which comprises a ballasting group. The object of the ballasting group is to render the azo compounds substantive to the layer in the photographic material in which they are coated.

The following Examples will serve to illustrate the invention.

EXAMPLE 1

1-hydroxy-4[3-(7-amino-5-phenyl-5,10-phenazonia)azo]-2-naphth-4-(2-[2,4-ditertamylphenoxy)n-butylamide]tetrafluoroborate (or zwitterion)

Phenosafranine (0.33 g) was dissolved by heating in 2-methoxyethanol (20 ml), cooled to 40° C. and 42% tetrafluoroboric acid (1.6 ml) added and the mixture cooled to 5° C. A solution of sodium nitrite (0.1 g) in water was added and the mixture stirred at 5° C. for 1 hour. A solution of 1-hydroxy-2-naphth-4-(2-ditertamylphenoxy)-n-butylamide (0.33 g) in 2-methoxyethanol (7 ml) was added followed by dropwise addition of sodium acetate (1.25 g) in a solution of 2-methoxy ethanol (8.5 ml) and water (1.5 ml). The resultant dyestuff separated from solution. The mixture was poured into water (200 ml) and the solid collected. It was recrystallised from 2-methoxy ethanol yielding almost black needles, m.p. 252° C. Analysis indicated that the dyestuff was without anion. It is described by formula (10).

EXAMPLE 2

4-[3-(7-amino-5-phenyl-5,10-phenazonia)azo]-N-n-octadecyl-N-methylaniline tetrafluoroborate Phenosafranine (0.33 g) was diazotised as described above, then a solution of N-n-octadecyl-N-methylaniline (0.2 g) in 2-methoxy ethanol (7.0 ml) added at 5° C. Sodium acetate (2 g approx) in aqueous 2-methoxy ethanol was added dropwise. The mixture was poured into water (200 ml) and the solid collected, which was washed and dried, m.p. 190°-2° C. Thin layer chromatography (SiO$_2$ gel/glass/5 CHCl$_3$/1 CH$_3$OH) showed presence of a single blue-black spot. The dyestuff is described by formula (9).

EXAMPLE 3

1-hydroxy-4-[3-(7-amino-5-phenyl-5,10-phenazonia)azo]-2-naphth[3-(2,4-ditertamylphenoxy) n-propylamide]zwitterion This dye was prepared as described for Example 1 except the coupler used was 1-hydroxy-2-naphth-[3-(2,4-ditertamylphenoxy) n-propylamide].

The dye separated as blue-black needles from 2-methoxy ethanol, m.p. 275° C. Analysis indicated that it was without anion.

EXAMPLE 4

1-hydroxy-4-[3-(7-amino-5-phenyl-5,10-phenazonia)azo]-2-naphth-[5-(2,4-ditertamylphenoxy acetylamino)-2-chloroanilide]zwitterion This dye was prepared as described for Example 1 except that the coupler used was 1-hydroxy-2-naphth-[5-(2,4-ditertamylphenoxy acetylamino)-2-chloroanilide]. It is recrystallised from 2-methoxy ethanol and has a m.p. of 275° C.

EXAMPLE 5

1-hydroxy-4-[3-(6-amino-10-methyl-acridinio)azo]-2-naphth-[4-(2,4-ditertamylphenoxy)n-butylamide]tetrafluoroborate or zwitterion This dye was prepared by the method described in Example 1, except the phenosafranine (0.33 g) was replaced by acriflavine (0.28 g). Purple black crystals, m.p. 213° C. Thin layer chromatography showed a purple spot. The dyestuff corresponds to formula (16).

EXAMPLE 6

1-hydroxy-4-[3-(6-amino-2,7-dimethyl-acridinyl)azo]-2-naphth-[4-(2,4-ditertamylphenoxy)n-butylamide]

The dye was prepared according to the method of Example 1, except that the phenosafranine (0.33 g) was replaced by Acridine yellow (0.28 g). Purple black crystals, m.p. 165° C. Thin layer chromatography showed a single purple spot. The dyestuff corresponds to formula (18).

EXAMPLE 7

1-hydroxy-4-[3-(7-dimethylamino-2-methyl-phenothiazonia)azo]-2-naphth-[4-(2,4-ditertamylphenoxy)n-butylamide]-chloride or zwitterion The dye was prepared according to the method described in Example 1, except that the phenosafranine (0.33 g) was replaced by Toluidine blue (0.3 g). The product is isolated as blue-black crystals, m.p. 90°-5° C. The dyestuff is described by formula (14).

EXAMPLE 8

1-hydroxy-4-[3-(7-amino-8,9-benz-phenoxazonia)azo]-2-naphth-[4-(2,4-ditertamylphenoxy)n-butylamide]tetrafluoroborate or zwitterion This oxazine dye was prepared by the method described in Example 1, except that phenosafranine (0.33 g) was replaced by Cresyl violet acetate (0.35 g). The product was blue-black crystals, m.p. 230°-5° C. Thin layer chromatography (SiO$_2$ gel/glass/5 CHCl$_3$/1 (CH$_3$OH) showed the presence of a single blue spot. The dyestuff is described by formula (12).

EXAMPLE 9

1-hydroxy-4[3-(7-amino-9-[2-hydroxycarbonylphenyl]-10-oxonia anthracenyl)azo]-2-naphth-[4-(2,4-ditertamylphenoxy)n-butylamide]tetrafluoroborate or zwitterion This dye was made by using the method described in Example 1, except phenosafranine (0.33 g) was replaced by Rhodamine 110 (0.36 g). The compound is a red-brown solid, laving a melting point of 135° C. and corresponding to formula (20).

What is claimed is:

1. An azo dye of the general formula

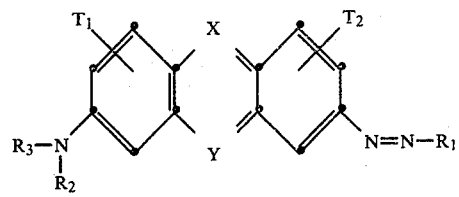

where X is N or CR$_4$ where R$_4$ is a hydrogen atom, alkyl having 1 to 4 carbon atoms, phenyl, phenyl substituted by carboxyl, alkyl having 1 to 4 carbon atoms, hydroxy or halogen, Y is S$^+$, N$^+$R$_5$, O$^+$ or N where R$_5$ is alkyl having 1 to 4 carbon atoms, phenyl, phenyl substituted by alkyl having 1 to 4 carbon atoms, halogen, hydroxy or carboxyl, R$_1$ is a group of the formula

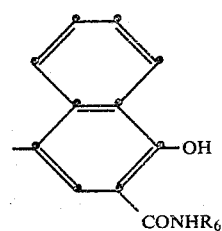

wherein R$_6$ is a group of the formula

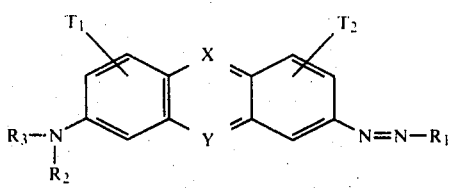

$R_2$ and $R_3$ are each hydrogen atoms or alkyl groups having 1 to 4 carbon atoms, or $R_2$ and $R_3$ together with the nitrogen atom complete a 5- or 6-membered heterocyclic ring, or one of $R_2$ and $R_3$ can be hydrogen and the other of $R_2$ and $R_3$ can be phenyl, and $T_1$ and $T_2$ represent hydrogen atoms, alkyl having 1 to 4 carbon atoms, amino groups, halogen or form a benzannelated ring.

2. An azo dye according to claim 1 which is an azophenazine dye of the general formula

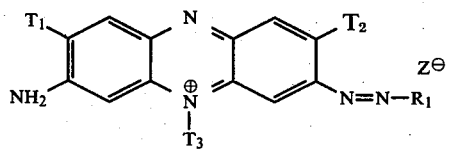

where $R_1$, $T_1$ and $T_2$ have the meanings assigned to them in claim 1, $T_3$ is phenyl or alkyl of 1 to 4 carbon atoms and $Z^\ominus$ is an anion.

3. An azo dye according to claim 2 where $T_1$ and $T_2$ are both methyl.

4. An azo dye according to claim 2 wherein $T_3$ is phenyl.

5. An azo dye according to claim 2 wherein $Z^\ominus$ is a fluoroborate ion.

6. An azo dye according to claim 1 which is an azooxazine dye of the general formula

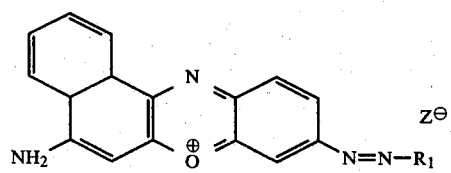

where $R_1$ has the meaning assigned to it in claim 1 and $Z^\ominus$ is an anion.

7. An azo dye according to claim 1 which is an azothiazine dye of the general formula

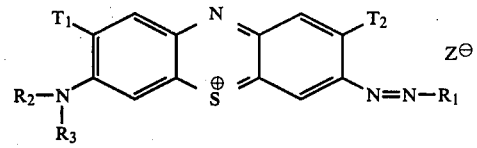

where $T_1$, $T_2$, $R_1$, $R_2$ and $R_3$ have the meanings assigned to them in claim 1 and $Z^\ominus$ is an anion.

8. An azo dye according to claim 7 wherein $R_2$, $R_3$ and $T_2$ are each methyl.

9. An azo dye according to claim 1 which is an azoacridine dye of the general formula

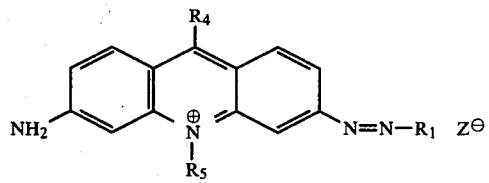

where $R_1$, $R_4$ and $R_5$ have the meanings assigned to them in claim 1 and $Z^\ominus$ is an anion.

10. An azo dye according to claim 9 wherein $R_4$ is hydrogen and $R_5$ is methyl.

11. An azo dye according to claim 1 which is an azoacridine dye of the general formula

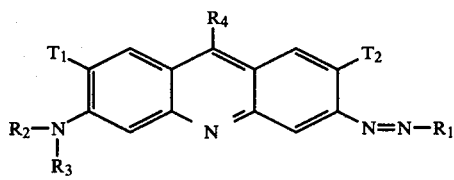

where $R_1$, $T_1$, $T_2$, $R_2$, $R_3$ and $R_4$ have the meanings assigned to them in claim 1.

12. An azo dye according to claim 11 wherein $T_1$ and $T_2$ are each methyl groups and $R_2$, $R_3$ and $R_4$ are hydrogen.

13. An azo dye according to claim 1 which is an azopyrylium dye of the general formula

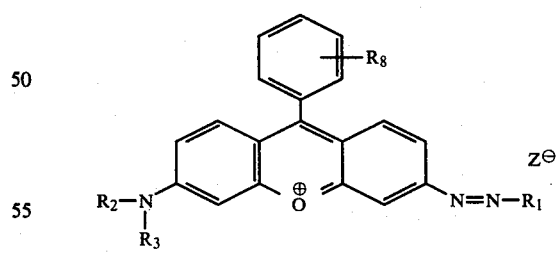

where $R_1$, $R_2$ and $R_3$ have the meanings assigned to them in claim 1, $R_8$ is a substituent and $Z^\ominus$ is an anion.

14. An azo dye according to claim 13 wherein $R_8$ is a —COOH group.

15. An azo dye according to claim 13 wherein $R_2$ and $R_3$ are hydrogen.

* * * * *

UNITED STATES PATENT AND TRADEMARK OFFICE
CERTIFICATE OF CORRECTION

PATENT NO. : 4,285,859
DATED : August 25, 1981
INVENTOR(S) : Rainer Kitzing, et al.

It is certified that error appears in the above—identified patent and that said Letters Patent is hereby corrected as shown below:

Column 3, line 14, delete "Z $^+$ and insert -- Z $^-$ --

Column 6, line 38, delete "is" and insert --and--.

Column 9, lines 1-9 delete structural formula and insert

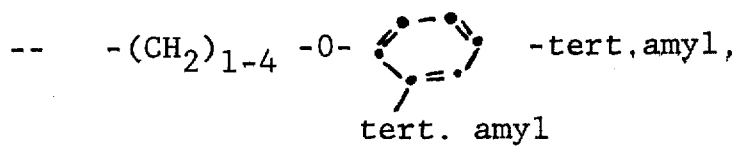

Signed and Sealed this

Twenty-third Day of March 1982

[SEAL]

Attest:

GERALD J. MOSSINGHOFF

Attesting Officer   Commissioner of Patents and Trademarks